Nov. 18, 1952 J. P. ECKERT, JR., ET AL 2,618,709

CYLINDRICAL CONTACT MAGNETIC HEAD

Filed July 16, 1949 4 Sheets-Sheet 1

INVENTORS.
John Presper Eckert Jr.
Leon Robert Mock
by George V. Eltgroth
Attorney Nov. 18, 1952 J. P. ECKERT, JR., ET AL 2,618,709

CYLINDRICAL CONTACT MAGNETIC HEAD

Filed July 16, 1949 4 Sheets-Sheet 2

INVENTORS.
John Presper Eckert Jr.
Leon Robert Mock
by George V. Eltgroth
Attorney INVENTORS.
John Presper Eckert Jr.
Leon Robert Mock
by George V. Eltgroth
Attorney Nov. 18, 1952 J. P. ECKERT, JR., ET AL 2,618,709

CYLINDRICAL CONTACT MAGNETIC HEAD

Filed July 16, 1949 4 Sheets-Sheet 4

INVENTORS.
John Presper Eckert Jr.
Leon Robert Mock
by George V. Elliott
Attorney Patented Nov. 18, 1952 2,618,709

UNITED STATES PATENT OFFICE 2,618,709

CYLINDRICAL CONTACT MAGNETIC HEAD

John Presper Eckert, Jr., and Leon Robert Mock, Philadelphia, Pa., assignors to Eckert-Mauchly Computer Corporation, Philadelphia, Pa., a corporation of Pennsylvania Application July 16, 1949, Serial No. 105,204

10 Claims. (Cl. 179—100.2)

This invention relates generally to recording and reproducing heads for magnetic recording apparatus, and more particularly to improvements in the construction and operation of multiple-channel magnetic head units.

The invention is particularly useful in multiple-channel recording apparatus of the type in which signals recorded simultaneously in a plurality of channels on a magnetic tape bear a definite relation one to the other and it is desired to reproduce, from the tape, signals having the same relationship. For example, in electrical typewriter systems, electrical computer systems and the like, magnetic tapes are used for storing coded information in the form of pulses represented as a series of minute magnetized spots distributed in a plurality of parallel longitudinally disposed channels, selectively arranged so that a particular combination of pulses existing in corresponding positions in various channels may represent numbers, letters, punctuations, machine instructions or other information. In order to accommodate a relatively large number of signal channels on a tape, the electromagnetic translating devices in the heads of the recording apparatus may be staggered or offset from each other, generally, transversely of the tape.

In some applications of such systems the recovery of the stored information requires the substantially simultaneous delivery of signals in each pulse combination to the utilization means. Preferably then, the reproducing devices should deliver simultaneously from the tape, as nearly as possible, the signals which theoretically should be delivered simultaneously. If the signals in each pulse combination are to be reproduced simultaneously, it is evident that the arrangement of the translating devices in the recording and reproducing head units must be identical, and, in addition, the relative positions of the signals in the tape at the time of reproduction must be the same as at the time of recording.

It has been found that magnetic heads commonly employed in practice present certain difficulties in the operation of multiple-channel recording apparatus, particularly in the apparatus of systems referred to above. The difficulties are attributed to the fact that present multiple-channel heads are of such design and construction that the gap areas, or active surfaces, over which the tape passes lie in a common plane, providing what is generally referred to as a flat-type head, and in addition considerable distance is required between the gap areas in adjacent channels. With flat-type heads, some form of pressure means, such as felt pads mounted upon spring members, are generally required to hold the tape in positive contact with the active gaps of the head. Multiple-channel head units usually require individual pressure means, separately adjustable, to insure that the same tape pressure is applied at each gap area. For minimum wear of the tape and head and minimum loading upon the tape driving means, pressures just sufficient to hold the tape in positive contact with the head are desirable.

However, thin magnetic tapes, particularly those of metal, very easily acquire wrinkles, even with careful handling, and the presence of wrinkles in the vicinity of the gap areas deleteriously affects the response of the translating apparatus. To press out wrinkles in the tape requires pressures far greater than those normally needed to hold the tape in contact with the head. In addition to the problems arising from the need of tape pressure means and from the presence of wrinkles in the tape, further difficulties with magnetic heads of prior design and construction are experienced in systems whose correct performance depends upon the relative positions of the signals in the various channels. If the signals are to be maintained at their same relative positions, any changes therein brought about by operating conditions such as tape stretching after recording, or tape skewing with respect to the head should be kept to a minimum. Due to the aforementioned comparatively large distance between gap areas in adjacent channels any appreciable tape stretching or skewing tends to prevent the simultaneous response of the pick-up units to the signals in the tape.

In accordance with the present invention there is provided a multiple-channel head unit for magnetic tape recording apparatus of such design and construction that the tape contacting portions of the head may be a cylindrical surface of relatively small radius. By feeding the tape to and from the head at an appropriate angle the normal tape tensions provided by the tape driving mechanism are sufficient to maintain the tape in positive contact with the active surface of the head and to effect removal of any wrinkles present in the tape from the portion of the tape in contact with the head. Furthermore, the construction features provided by this invention permit very close spacing of the gap areas in adjacent channels thereby minimizing the undesirable effects produced by tape stretching and tape skewing.

It is, therefore, a primary object of this invention to provide a novel and improved magnetic head unit for recording or reproducing signals on a magnetic tape.

Another object is to provide a novel and improved magnetic head of the type adapted to record and reproduce signals in a plurality of channels along the length of a magnetic tape.

A more specific object of the invention is to provide a novel and improved magnetic head for recording and/or reproducing pulse-like signals in a plurality of channels along the length of a magnetic tape.

An additional object of the invention is to provide a pick-up unit which will insure as nearly as possible simultaneous delivery from a magnetic tape of signals which should theoretically be delivered simultaneously.

Another object is to provide recording and pick-up assemblies of such type as to make easy precise duplication of construction so that records made on one mechanism may be reproduced on another with the assurance of accurate reproduction of the original recorded information.

A further object of the invention is to provide means for recording and reproducing information to or from a number of very closely arranged channels on a tape without cross-talk during recording or reproduction.

A specific object is to provide a multiple-channel magnetic head unit having a cylindrically shaped active tape contacting portion.

Other objects and advantages of the invention will become apparent from the following description taken in conjunction with the accompanying drawings in which.

Figure 1:
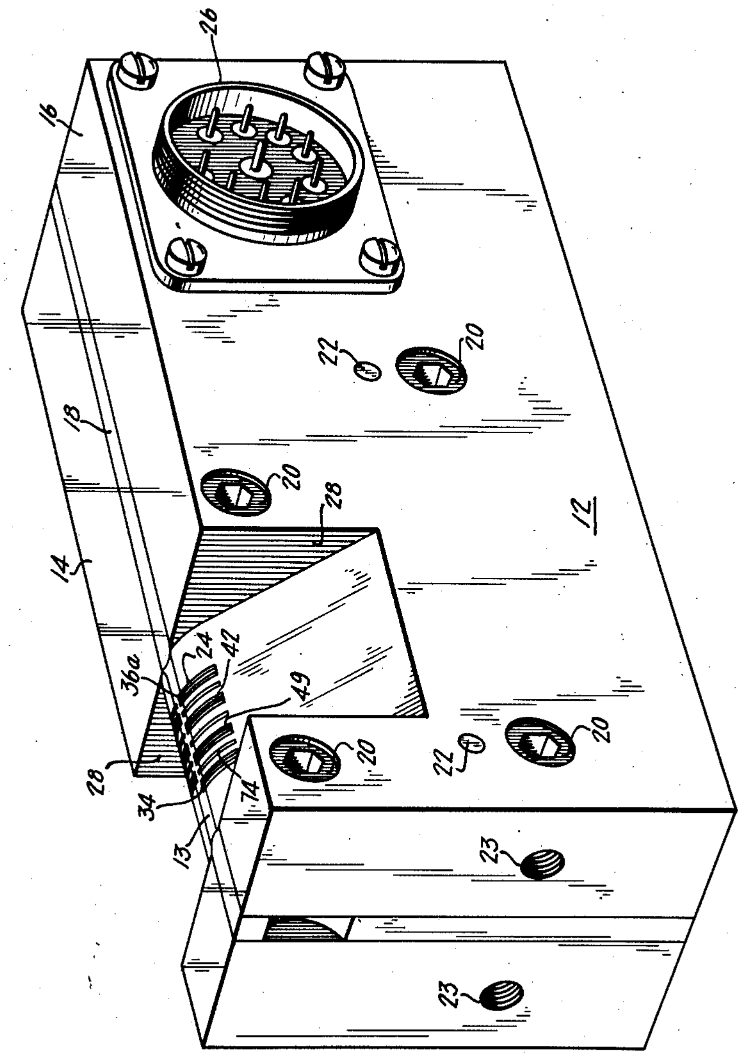
Figure 1 is a perspective view of a multiple-channel magnetic head unit in accordance with the present invention.

In the drawings there is illustrated, by way of example, an eight channel magnetic head unit 12 adapted for use with ribbon-like magnetic tapes and having a cylindrical surface 13 for the active tape contacting portion of the head. As shown in Figure 1, head unit 12 comprises two side blocks 14 and 16 and a narrow center block 18, of non-magnetic material, such as "K Monel" metal, accurately ground and machined for assembly by screws 20 and aligning pins 22. Tapped holes 23 may be provided for mounting the head unit. The adjacent faces of these blocks are ground flat so as to insure close dimensional tolerances and, as described more fully hereinafter, are provided with slots and recesses for supporting the eight electromagnetic translating devices indicated generally in Figure 1 by reference numeral 24. The construction of devices 24 will be described in detail with reference to Figure 2. In order to provide the necessary spacing for the translating devices consistent with recording or reproducing, simultaneously, signals in eight channels on a narrow magnetic tape, they are arranged in two groups of four each, one group being supported in the adjacent faces of blocks 14 and 18 and the other group being mounted in the adjacent faces of blocks 16 and 18.

For making external connections to the translating devices a terminal connector, such as a receptacle 26, is mounted on the outer surfaces of blocks 14 and 16. The tape reading region 13 may be shaped as a sector of a cylinder by accurately grinding, before assembly, the top surfaces of the portions of the blocks in which the devices 24 are mounted. The notched portion 28 formed in the side blocks by this operation provides clearance for the tape. A better understanding of the manner in which blocks 14, 16 and 18 are machined may be obtained by first describing the construction of translating devices 24.

Figures 2, 8:
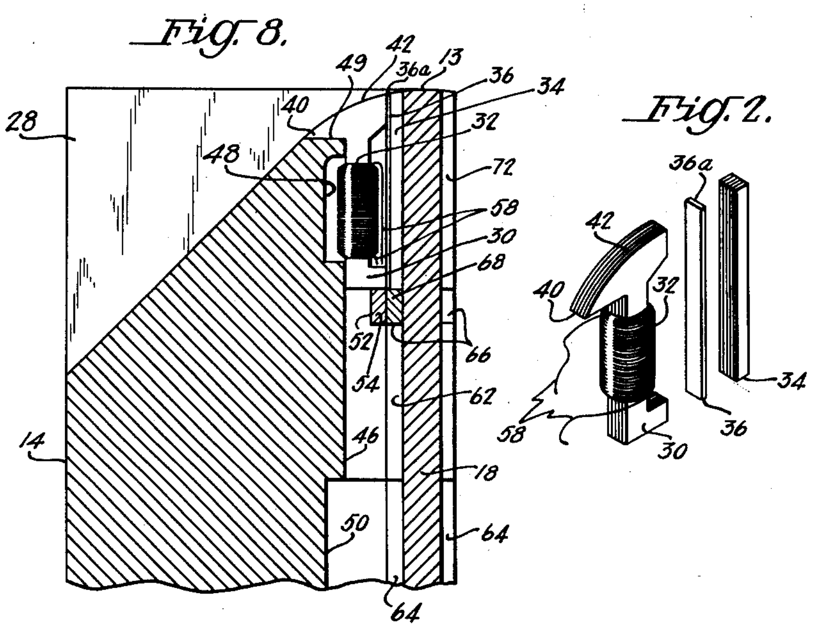
Figure 2 is an exploded view illustrating the construction of the electromagnetic translating devices embodied in the head unit of Figure 1.
Figure 8 is an enlarged fragmentary view of Figures 4 and 7 combined showing one of the electromagnetic translating devices in position.

Referring to Figure 2 each device 24 comprises a first laminated core structure 30 upon which is wound the signal coil 32, a second laminated core structure 34 for completing the magnetic circuit through core 30, and a non-magnetic shim 36 for interrupting the continuity of cores 30 and 34. Shim 36, which may be aluminum or brass sheeting from .0001 to .001 in thickness, defines the gap area or active surface 36*a* of the translating device for producing magnetization of the tape or for reproducing signals therefrom.

Precisely dimensioned laminations are used for the core structures. Core 30 is of generally U-shaped configuration but, as shown in the drawings, with one leg having an overhanging portion 40 of sufficient width to provide for an arcuate surface 42, conforming with cylindrical surface 13. Since the entire winding of signal coil 32 is placed upon core 30, yoke 34 may be made up from a stack of straight laminations. As may be observed in Figure 1, when devices 24 are assembled in head unit 12, only the curved surface 42 of cores 30, the corresponding ends of cores 34 and the gap areas 36*a* provided by shims 36 are exposed. It may be observed also that the translating devices provided by this invention permit the very close spacing of the gap areas 36*a* in adjacent channels.

Figure 3:
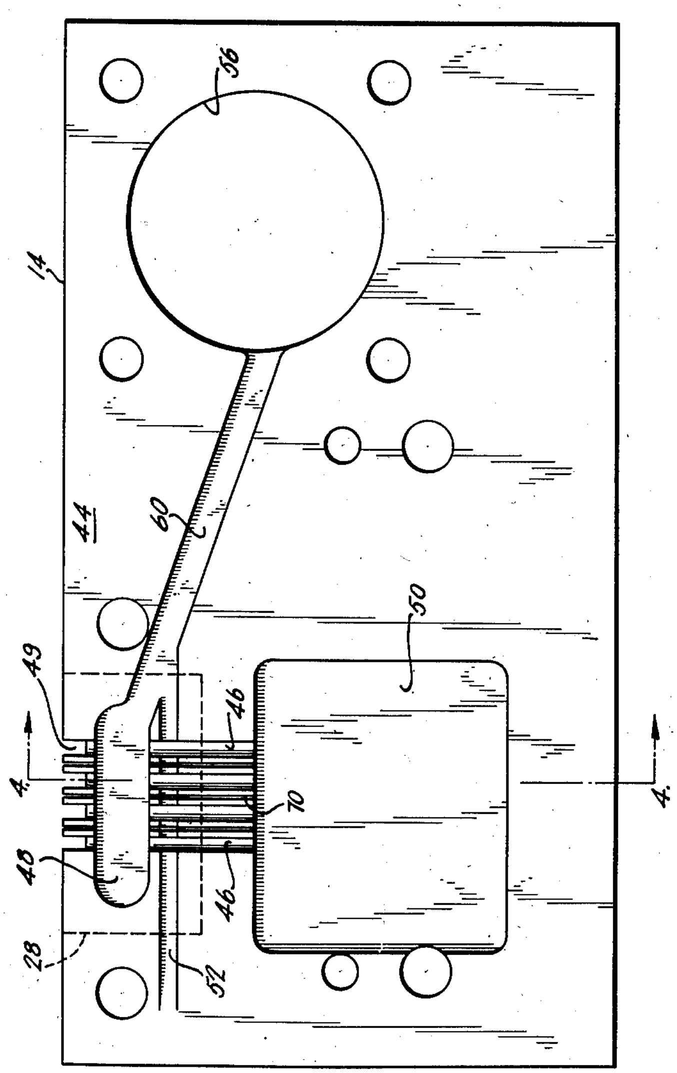
Figure 3 is a side elevational view of the left side block in Figure 1 as though viewed from the center block.
Figure 4:
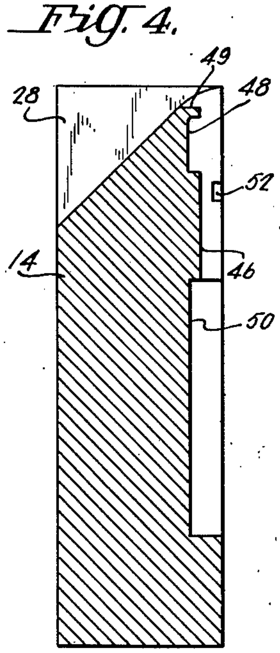
Figure 4 is a sectional view taken along the line 4—4 in Figure 3.

The manner in which devices 24 are mounted in blocks 14, 16 and 18 will now be described. The machining of side blocks 14 may be best understood by considering jointly Figures 3, 4 and 8. The upper portion of face 44, adjacent to block 18, is provided with four equally-spaced milled slots 46, each of the proper depth to permit the insertion of a core 30 so that its pole faces are flush with face 44, a milled recess 48 being provided for receiving windings 32. Portions 49 of block 14 are cut out for receiving projections 40 on cores 30. The minimum distance between slots 46 is, of course, determined by the space required for winding 32. As an aid in milling slots 46 there is provided a substantially rectangular recess 50 having a depth equal to, or, preferably, slightly greater than the depth required for the slots. This recess provides a free space region at the end (or start) of the milling operation and in addition serves as a guide for milling all of the slots to the same length and to a uniform depth throughout their length.

Transverse to slots 46 there is provided a milled slot 52 for holding a brass strip 54 which serves as a rest or stop for cores 30. Slot 52 is accurately positioned so that the curved surfaces 42 of cores 30 lie in the cylindrical surface 13. At the location for receptacle 26, a hole 56 is drilled for receiving the connecting leads 58 from each device 24 in the group to the receptacle terminals. A channel 60 connects the head region with the receptacle location. The manner in which the top surface of block 14 is ground is shown in the cross-sectional views of Figures 4 and 8.

As may be observed in Figure 1 the faces of center block 18 support cores 34. Thus, as shown in Figures 5 to 8, the upper portion of face 61 adjacent to block 14 is provided with four milled slots 62 aligned with slots 46 and of a depth permitting yokes 34 to be inserted flush with face 61. A recess 64 may be provided for the purposes explained above with reference to recess 50. There is provided also an accurately milled slot 66 transverse to slots 62 for receiving the brass stop strip 68 for yokes 34.

Referring now to the machining of the adjacent faces of blocks 16 and 18 which support cores 30 and yokes 34, respectively, this is performed in a manner similar to that described above for the adjacent faces of blocks 14 and 18 except, of course, now the locations for slots 46 and 62 are alternated with those in the adjacent faces of blocks 14 and 18, and, in addition, the adjacent faces of blocks 16 and 18 are machined in complementary fashion with respect to the adjacent faces of blocks 14 and 18. However, with slots 46 and 62 in Figures 3 and 5, respectively, located in their alternate channel positions and with Figures 3, 4, 5, 7 and 8 considered with respect to their mirrored views, it is believed obvious that these drawings are applicable to the adjacent faces of blocks 16 and 18. Consequently, it is deemed unnecessary to describe further the machining of block 16 and the face of block 18 adjacent thereto.

Between slots 46 in blocks 14 and 16 and between adjacent slots 62 in block 18 there are sawed slits 70 and 72, respectively, into which are driven, after assembly, thin sheets 74 of soft iron. These sheets serve as magnetic shields to minimize cross-talk between adjacent translating devices.

To secure greatest accuracy the grinding of the adjacent faces of the blocks may be accomplished with the laminated cores and stop strips in place. Cores 30 with windings 32 may be held securely in slots 46 by means of any suitable embedding compound and yokes 34 and strips 54 and 68 may be cemented in the slots provided for them. After the head unit is completely assembled with the shims 36 and shields 74 in place, cylindrical surface 13 may be re-ground to insure the presentation of a smooth surface to the tape. If desired, the active portion of the head unit may be plated with a non-magnetic metal, such as chromium, to confine wear to the plating which can be readily renewed when necessary.

Figure 9:
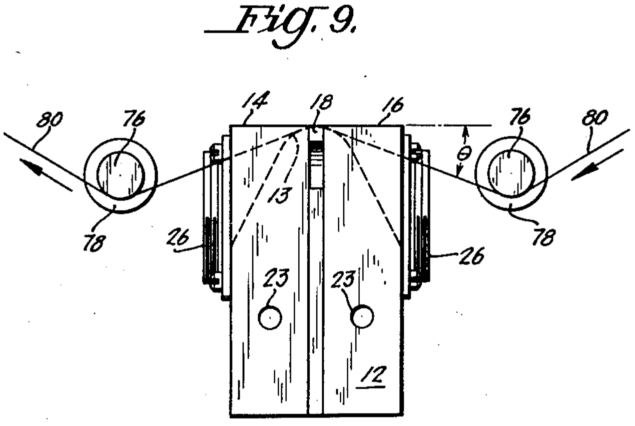
Figure 9 is a diagram illustrating the recording and pick-up head of Figure 1 in operation.
Figure 7:
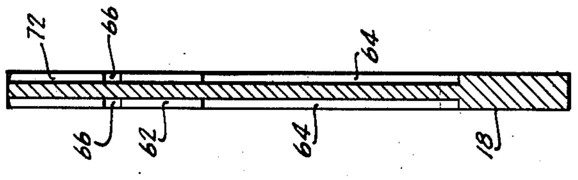
Figure 7 is a sectional view taken along the line 7—7 in Figure 5.
Figure 6:
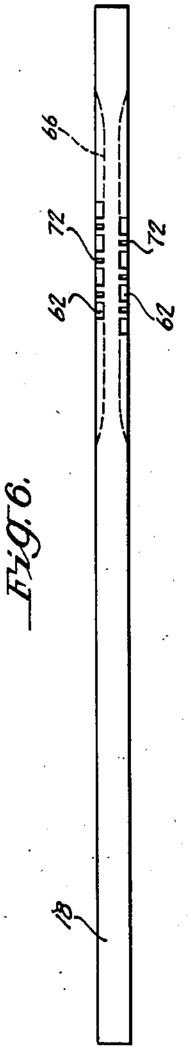
Figure 6 is a top plan view of the center block in Figure 1.
Figure 5:
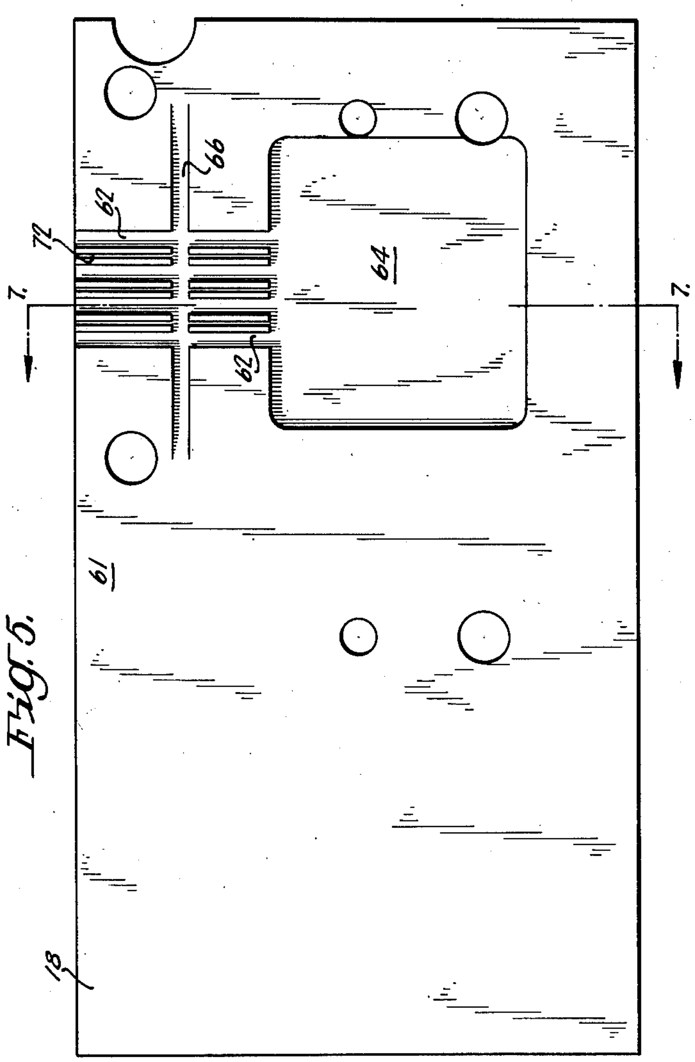
Figure 5 is a side elevational view of the center block in Figure 1 as though viewed from the side block in Figure 3.

As previously mentioned, in the operation of recording apparatus employing the cylindrical contact magnetic head units provided by this invention, the tape is fed to and from the head at an angle such that the normal tape tension provided by the tape driving mechanism is effective to maintain the desired pressure at the reading station and to remove any wrinkles present in the tape from the portion in contact with the head. Figure 9 is a diagram showing how magnetic tape is fed to head unit 12. In the drawing, a suitable guide 76 such as a pin or roller, having a flange 78 at each end is suitably positioned on each side of head 12 for guiding the tape 80 over the cylindrical surface 13 with the desired angle of approach $\theta$. Beyond guides 76 the tape may be fed to supply and take-up reels in a conventional manner, consequently for sake of simplicity the remaining portion of the tape driving mechanism is not shown in the drawings.

Head units in accordance with this invention should be made with the greatest degree of accuracy since upon it depends the accuracy of the location of the signals recorded on the tape and the proper reproduction from the signals. Also guides 76 should have minimum clearance between flanges 78 to minimize movement of the tape laterally or in skew position.

The embodiment of the invention illustrated in the drawings has been employed in practice to record or reproduce pulse signals simultaneously in eight channels on thin metallic tape one-half inch wide. The thickness of center block 18, and hence the distance between the gap areas 36a in the two groups of devices 24, was only one-eighth of an inch. With a tape tension of approximately seven ounces, optimum performance was obtained with a radius of curvature for cylindrical surface 13 of five-sixteenths of an inch and with a tape angle $\theta$ of twenty degrees. The radius of surface 13 and the tape angle $\theta$ are not critical and may be varied within limits governed by certain practical considerations. For example, with metallic tapes the smallest radius, practical for construction in a multiple-channel head unit, is one which does not stress the tape beyond its elastic limit. It may be noted that smaller radii give greater change in the distance between the two groups of gap areas with wear of the active surface of the head but less change in the distance between the two groups of recorded signals with tape stretching after recording.

In regard to tape angles, with the larger angles, greater portions of the tape are in contact with the head and consequently tape wear is increased.

While this invention has been described and illustrated with reference to a specific embodiment, it is to be understood that the invention is capable of various modifications and applications, not departing essentially from the spirit thereof, which will become apparent to those skilled in the art. For example, with wider tapes or fewer channels all, of the translating devices 24 might have their active gap areas arranged side by side in a single transverse line.

What is claimed is:

1. In combination, a first substantially non-magnetic support member having a mating boundary and a substantially cylindrical surface adjacent thereto, a second substantially non-magnetic support member mating with said first support member and having a substantially cylindrical surface adjacent its mating boundary, and elements comprising a magnetic circuit with an interposed gap secured within said support members at their mating boundaries, said interposed gap being situated within an exposed portion of said magnetic elements smoothly blending into said adjacent cylindrical surfaces and having a flux direction line intersecting the major plane produced of said first support member and the major plane produced of said second support member.

2. In combination, a first substantially non-magnetic support member provided with a plurality of core receiving chambers in one of its boundaries and having a substantially cylindrical surface adjacent said boundary, a second substantially non-magnetic support member provided with a plurality of complementary core receiving chambers in one of its boundaries mating with said first boundary and having a substantially cylindrical surface adjacent its mating boundary, a plurality of magnetic cores situated within said chambers and having a gap containing exposed surface flush with the adjacent support surfaces and provided with a corresponding curvature, said gap having a flux direction line intersecting the major plane produced of said first support member and the major plane produced of said second support member, and signal coils individually associated with said cores.

3. In combination, a first substantially non-magnetic support member provided with a plurality of coil and core receiving chambers in one of its boundaries and having a substantially cylindrical surface adjacent said boundary, a second substantially non-magnetic support member provided with a plurality of complementary yoke receiving chambers in one of its boundaries mating with said first boundary and having a substantially cylindrical surface adjacent its mating boundary, signal coil bearing cores situated within said chambers in said first support member having an exposed portion blending into said cylindrical surface, magnetic yokes situated within said chambers in said second support member having an exposed portion blending into said cylindrical surface, substantially non-magnetic shims separating said yokes from their corresponding cores at said exposed surfaces, and a plurality of members securing said supports in associative relationship.

4. In combination, a first substantially non-magnetic end member provided with a plurality of coil and core receiving recesses in one of its boundaries and having a substantially cylindrical contour adjacent said boundary, a second substantially non-magnetic end member provided with a plurality of coil and core receiving recesses in one of its boundaries and having a substantially cylindrical contour adjacent said boundary, a third substantially non-magnetic central member provided in opposite boundaries with mutually offset yoke receiving recesses complementing those in said first and second members respectively and having the surface intermediate said opposite boundaries provided with a substantially cylindrical contour, signal coil bearing magnetic cores situated within said recesses in said first and second members having an exposed portion blending into said cylindrical contour, magnetic yokes situated within said recesses in said third member having an exposed portion blending into said cylindrical contour, substantially non-magnetic shims separating said yokes from their corresponding cores at said exposed surfaces, and a plurality of members clamping said first, second and third members with their associated magnetic elements into a unit assembly.

5. In combination, a first substantially non-magnetic support member provided with a plurality of coil and core receiving recesses in one of its boundaries and having a substantially cylindrical contour adjacent said boundary, a second substantially non-magnetic support member provided with a plurality of complementary yoke receiving recesses in one of its boundaries adapted to mate with said first boundary and having a substantially cylindrical contour adjacent its mating boundary, one of said support members being further provided with a lead channel connecting with a receptacle mounting, signal coil bearing magnetic cores situated within said first recesses having an exposed portion blending smoothly into said cylindrical contour, magnetic yokes situated within said second recesses having an exposed portion blending smoothly into said cylindrical contour, substantially non-magnetic shims separating said yokes from their corresponding cores at said exposed surfaces, connecting leads extending from said signal coils to said receptacle mounting, and a plurality of members securing said supports in associative relationship.

6. In magnetic apparatus, a substantially non-magnetic support member provided with a plurality of first slots in one face thereof intersecting another of the bounding surfaces and a transversely disposed second slot intersecting said plurality of slots, a stop member mounted in said transversely disposed slot, and a plurality of magnetic cores carried in said first slots with one end in abutting relationship with said stop member and the other end flush with the surface of said non-magnetic support member.

7. In magnetic apparatus, a substantially non-magnetic support member provided with a plurality of first slots in one face thereof intersecting another of the bounding surfaces, a second coil receiving transversely disposed slot intersecting said plurality of first slots, and a third stop member receiving slot displaced from said second slot intersecting said plurality of first slots, and a plurality of coil bearing magnetic cores situated in said first slots with one end in abutting relationship with said stop member, the other end flush with the surface of said non-magnetic support member, and said coil disposed within said second slot.

8. In combination, a first substantially non-magnetic support member provided with a plurality of coil and core receiving recesses in one of its boundaries and having a substantially cylindrical contour of not more than one-half inch radius adjacent said boundary, a second substantially non-magnetic support member provided with a plurality of complementary yoke receiving recesses in one of its boundaries adapted to mate with said first boundary and having a substantially cylindrical contour of not more than one-half inch radius adjacent its mating boundary, one of said support members being further provided with a lead channel connecting with a receptacle mounting, signal coil bearing magnetic cores situated within said first recesses having an exposed portion blending smoothly into said cylindrical contour, magnetic yokes situated within said second recesses having an exposed portion blending smoothly into said cylindrical contour, substantially non-magnetic shims separating said yokes from their corresponding cores at said exposed surfaces, connecting leads extending from said signal coils to said receptacle mounting, and a plurality of members securing said supports in associative relationship.

9. In combination, a first substantially non-magnetic support member, a second substantially non-magnetic support member mating with said first support member, and elements comprising a magnetic circuit with an interposed gap secured within said support members at their mating boundaries, said interposed gap being situated within an exposed portion of said magnetic elements and having a flux direction line intersecting the major plane produced of said first support member and the major plane produced of said second support member.

10. In combination, a first substantially non-magnetic support member having a substantially circular contour adjacent one of its boundaries, a second substantially non-magnetic support member mating with said first support member and having a substantially circular contour adjacent its mating boundary, and elements comprising a magnetic circuit with an interposed gap secured within said support members at their mating boundaries, said interposed gap being situated within an exposed portion of said magnetic elements and having a flux direction line intersecting the major plane produced of said first support member and the major plane produced of said second support member.

JOHN PRESPER ECKERT, Jr.
LEON ROBERT MOCK.

REFERENCES CITED

The following references are of record in the file of this patent:

UNITED STATES PATENTS

| Number | Name | Date |
|---|---|---|
| 2,195,192 | Schuller | Mar. 26, 1940 |
| 2,413,108 | Latchford | Dec. 24, 1946 |
| 2,493,742 | Begun | Jan. 10, 1950 |
| 2,536,272 | Friend | Jan. 2, 1951 |